Figure 1:
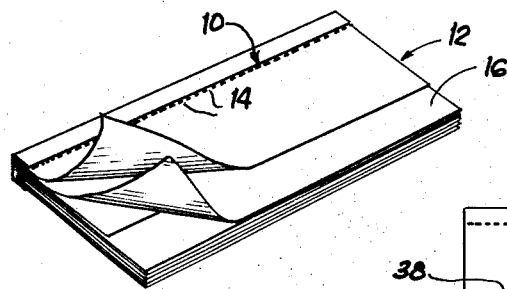

Sept. 8, 1964   E. N. HEINZ, SR   3,147,991
CHECKBOOK
Filed Nov. 13, 1962

INVENTOR.
Edward N. Heinz, Sr.
BY
Attys

United States Patent Office 3,147,991
Patented Sept. 8, 1964

3,147,991
CHECKBOOK
Edward N. Heinz, Sr., 424 Iowa St., Oak Park, Ill.
Filed Nov. 13, 1962, Ser. No. 237,272
5 Claims. (Cl. 282—23)

This invention relates to a checkbook and more particularly to a new and novel arrangement of check blanks and stubs whereby entry is required to be made of such information as the date, payee and the amount of the check as an incidence to the writing out of the check, and which embodies safeguards to prevent inadvertent or unauthorized use of the stub as a check and which provides for imprint of the check in a manner to prevent alteration thereof, and which permits processing of the checks through automatic read out and accounting equipment.

One of the problems sought to be overcome by the concepts of this invention resides in the tendency for many to write out checks without corresponding entry on record-keeping material, such that the payor often loses track of the check to the end that subsequent accounting becomes confused and inaccurate. Various schemes and techniques have been devised for the entry of the essential elements of the check upon a retained stub, but these have required the insertion of carbon or other transfer sheets which are often neglected by the payor because of the extra effort involved, and such duplicating sheets, embodying colored transfer coating materials, have been found to be undersirable because of discoloration of associated papers or the hands and clothing of the user.

Aside from the foregoing, the financial services are continuously in search of a foolproof means for the preparation of checks to prevent the unscrupulous from tampering with the amount for which the check has been written or other elements of the check.

Still further, automation in the handling of checks by banking or other financial institutions has made it desirable for the elements of the checks to be inscribed with materials of a particular composition, such as inks containing magnetic properties, so that the elements of the check can be read by such automatic equipment for recording, for tabulation or for sorting on the basis of one or more of the entries. It would be impractical to insist that checks be written by all payors with a specific type of ink, since ink compositions and writing implements available in the field may vary in the thousands.

It is an object of this invention to produce a checkbook which embodies all of the desirable features heretofore described.

More specifically, it is an object of this invention to produce a checkbook assembly which required entries to be made upon a stub concurrently with the entry of the particular information by the payor, so that there will always be an exact record of the essential information of the check on the stub that is permanently retained, and it is a related object to provide an assembly of the type described which is free of the necessity to insert a third sheet in the form of a carbon or other transfer sheet between the check and the stub and which is free of coatings of high color transfer value, thereby to provide for a clean and effective record system.

It is an object of this invention to produce a checkbook of the type described in which the elements inscribed on the check are incapable of alteration without detection, thereby to safeguard against the handling of an issued check in a manner not authorized by the payor.

Another object is to provide an assembly of the type described in which the essential elements of the check, including the payee, amount, date, the bank and the like are inscribed on the check with a uniform composition adapted for use with automatic accounting or sorting equipment regardless of the ink or tool used by the payor in writing the check.

Figure 2:
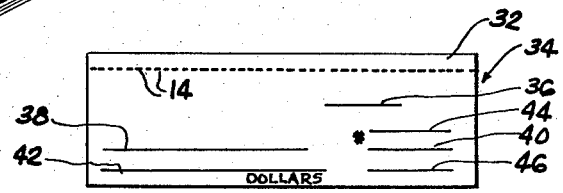
Figure 3:
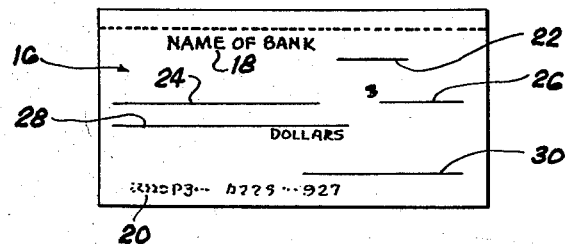
Figure 4:
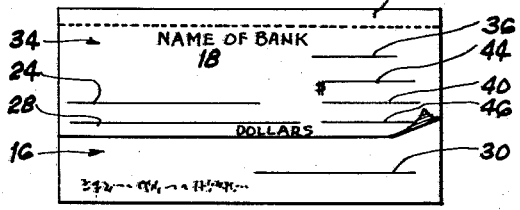
Figure 5:
Figure 6:
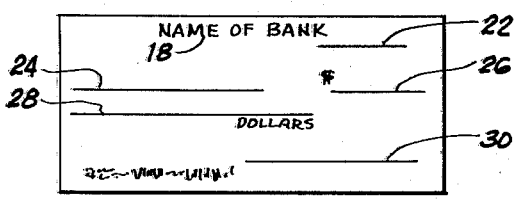

These and other objects and advantages of this invention will hereinafter appear and, for purposes of illustration, but not of limitation, an embodiment of this invention is shown in the accompanying drawings in which:

FIGURE 1 is a perspective view of a checkbook embodying the features of this invention with pages thereof turned up to illustrate the relationship therebetween;
FIGURE 2 is a top plan view of the stub;
FIGURE 3 is a top plan view of the check;
FIGURE 4 is a top plan view of the stub and check in their relative positions in use in the checkbook;
FIGURE 5 is an enlarged sectional view taken through a portion of the parts shown in FIGURE 4; and
FIGURE 6 is a top plan view of the written check.

Referring now to the drawings, the check sheet illustrated in FIG. 3 comprises a binder portion 10 separated from the check portion 12 by perforations 14 or tear line for separation of the check 12 from the binder portion 10. The check portion 12 is imprinted on its face 16 with the usual information such as the name 18 of the bank, the code 20 for the account, and with one line 22 for the date, another line 24 for designating the payee, another line 26 for the numerical amount of the check, a line 28 for the written amount of the check, and a line 30 in the bottom portion of the check for the signature of the payor.

The stub portion in FIG. 2 includes a binder portion 32 dimensioned to correspond with the binder portion of the check and a stub portion 34 joined integrally to the binder portion and dimensioned to correspond in its width with the width of the check portion and in its length with the portion of the check extending from the tear line to just below line 28 on which the amount of the check is written so that the stub will terminate short of the signature portion 30 of the check. The stub portion is imprinted on its top face with a line 36 for the date, a line 38 on which the name of the payee is written, a line 40 for the numerical amount of the check and a line 42 for the written amount of the check, with the lines of the stub overlying the corresponding lines of the check when the stub is arranged in position of use to overlie the check in the assembled relation in the checkbook.

The line 42 is not essential, and the stub can be provided in addition with columns in vertical alignment with the line 40, having line 44 above the line 40 for insertion of the previous balance and a line 46 below the line 40 for the insertion of the balance left in the account, after subtraction of the amount of the check. Other desirable information can also be provided on the face of the stub, which is adapted to be retained as a permanent record of the transactions in the checkbook.

A plurality of such assemblies of checks and stubs, with the stubs overlying the checks, are assembled together in a stack and bound into a checkbook through the binder end portions. In the assembly, each check is provided with its own stub which covers the face of the check except for the signature portion and coated portion at the bottom edge portion of the check.

In addition to the novel arrangement described above, the stub is provided with a continuous coating 50 on its bottom side, preferably formulated of an encapsulated liquid composition containing a coloring agent which is adapted to be freed for transfer from the backside to the corresponding portions on the top face of the underlying check, responsive upon rupture of the encapsulation in response to the force applied to the face of the stub on which all of the information, with the exception of the signature, is inscribed. Thus, all of the information, with the exception of the signature, is adapted to be inscribed on the face of the stub for duplication onto the corresponding areas of the underlying check, while the signature portion of the check remains uncovered so that the payor can apply his own signature directly to the check, without a corresponding damaging signature appearing on the face of the stub. Thus, the owner of the book remains unidentified by others who might come into possession of the checkbook, and there is no signature on the stub which might be used by an unscrupulous person to be cashed as a check.

The tinctorial agent encapsulated within coating 50 can be in the form of a pigment or a dyestuff in a liquid carrier or it can be supplied in the form of a substantially colorless dye component while the remaining components to complete the reaction and form the dyestuff or effect color development can be provided in a coating 52 embodied in the face portion of the imprinted check. Encapsulated coatings which may be used in the practice of this invention are described in the Green et al. Patent No. 2,548,366, and the color forming system wherein a substantial dye component is carried into a coating for reaction to form the dyestuff or color reaction embodied in another element, is described in the Klimkowski et al. Patent No. 2,634,677. The concepts of this invention include the system wherein the entire tinctorial agent is embodied as a dyestuff in an encapsulated liquid carrier without a coating 52 being necessary in the check sheet. It is intended to include a preferred practice wherein the imprinted face of the check sheet is provided with a coating of clear or other absorbent material which receives the liquid transferred from the ruptured encapsulations to develop the color. When use is made of the preferred practice of a coating in the face of the check containing a reactant, as defined in the Klimkowski et al. patent, or an absorbent for color reaction or color development, it will be apparent that the reproduction on the check will result only when the predetermined combination of elements are present between the encapsulated coating 50 on the backside of the stub and the receptive coating 52 in the top face of the check. This provides additional safeguards against either tampering with the matter inscribed on the check or effecting name change or alteration thereof.

The described arrangement does not find its counterpart in the arrangements heretofore employed wherein the stub underlies the check for the insertion of a carbon inbetween to transmit the information that is wrtiten directly on to the check. In the latter arrangement, inscription of the signature on to the check will result in duplication of the signature on to the stub, unless additional elements are inserted to provide a block since it is impractical selectively to coat the backside of the check and leave the signature portion uncoated. Further, the latter system, representative of the systems heretofore employed, does not provide for the safety features described for inscribing the check indirectly by reaction between predetermined materials embodied in coatings in the adjacent surfaces of the check and stub sheets.

An additional concept of considerable importance, made available in a system embodying the features of this invention, resides in the ability to formulate the transfer material captured in the rupturable encapsulation of the overall coating 50 on the backside of the stub to contain a component which, when transferred to the face of the check, permits the use of read out equipment for automation in the handling of the check. For example, the encapsulated liquid of the coating 50 can be formulated to contain magnetic iron oxide to provide a magnetic image in the transfer that is made to the check. Thus, by standardization of the processes and materials used to prepare the coating 50 on the stubs to contain such magnetic or other read out ingredient as a component thereof, the financial institutions can automate without regard to the type of ink, scribe, or printing means employed to make out the check.

It will be apparent from the foregoing that I have provided a simple and efficient means for record keeping, while at the same time introducing safeguards in the practice of writing checks, and that the concepts of this invention are also adapted to enhance automation in the handling of checks by the great financial institutions.

It will be understood that other changes may be made in the details of construction, arrangement and operation without departing from the spirit of the invention, especially as defined in the following claims.

I claim:

1. A checkbook wherein a plurality of pairs of stubs and underlying checks are assembled in a book, and wherein each of said pairs comprises a check imprinted on its face with various inscriptions including the name of the bank and places for the date, payee, and numerical sum of the check, written sum of the check, and payor's signature at the bottom portion of the check, and a stub positioned to overlie the imprinted face of the check and dimensioned to terminate short of the lower signature portion of the check and imprinted on its top face with places for the date, payor and the sum of the check with such places overlying the corresponding places on the face of the check, means for securing the stub in position of use to overlie the check, and a continuous coating on the backside of the stub containing a tinctorial agent which transfers to the top face of the underlying check in response to the pressure applied to the stub in filling out the places.

2. A checkbook as claimed in claim 1 in which the continuous coating on the underside of the stub contains a color component, and including a continuous coating on the top face of the check containing an agent which reacts with the continuous coating on the underside of the stub to develop color.

3. A checkbook as claimed in claim 1 in which the coating on the back side of the stub is an encapsulated coating containing a die-forming component in a liquid carrier and in which the check sheet has a continuous coating on the top face thereof which contains a component that reacts to form a coloring agent with the component embodied in the encapsulated coating.

4. A checkbook as claimed in claim 3 in which the encapsulated coating contains an ingredient which is responsive to automatic read out equipment.

5. A checkbook as claimed in claim 3 in which the ingredient is a magnetic material.

References Cited in the file of this patent

UNITED STATES PATENTS

| | | |
|---|---|---|
| 2,971,916 | Schleicher et al. | Feb. 14, 1961 |
| 3,048,426 | Rodriguez et al. | Aug. 7, 1962 |
| 3,058,758 | Govatsos | Oct. 16, 1962 |